US009635487B2

(12) United States Patent
Rodgers et al.

(10) Patent No.: US 9,635,487 B2
(45) Date of Patent: Apr. 25, 2017

(54) APPARATUS AND METHODS FOR PROVISIONING SUBSCRIBER IDENTITY DATA IN A WIRELESS NETWORK

(71) Applicant: Apple Inc., Cupertino, CA (US)

(72) Inventors: Clive Edward Rodgers, Palo Alto, CA (US); Stephan V. Schell, San Mateo, CA (US); Achim Pantfoerder, Cupertino, CA (US); Mohit Narang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 14/668,843

(22) Filed: Mar. 25, 2015

(65) Prior Publication Data

US 2015/0312699 A1   Oct. 29, 2015

Related U.S. Application Data

(63) Continuation of application No. 12/952,089, filed on Nov. 22, 2010, now Pat. No. 8,996,002.

(Continued)

(51) Int. Cl.
*H04M 3/00* (2006.01)
*H04W 4/00* (2009.01)
(Continued)

(52) U.S. Cl.
CPC .......... *H04W 4/001* (2013.01); *H04L 67/16* (2013.01); *H04W 8/08* (2013.01); *H04W 8/183* (2013.01); *H04W 8/265* (2013.01); *H04W 88/06* (2013.01)

(58) Field of Classification Search
CPC ....... H04W 4/001; H04W 12/06; H04W 4/24; H04W 84/12; H04W 24/08; H04W 4/02;
(Continued)

(56) References Cited

U.S. PATENT DOCUMENTS 8,666,368 B2   3/2014   Schell et al.
8,996,002 B2   3/2015   Rodgers et al.
(Continued)

FOREIGN PATENT DOCUMENTS

EP   2076071 A1   7/2009
JP   2007134797 A   5/2007
(Continued)

OTHER PUBLICATIONS

3GPP TS 35.205 V9.0.0, Specification of the MILENAGE Algorithm Set: An example algorithm set for the 3GPP authentication and key generation functions f1*, f2, f3, f4, f5*, Dec. 31, 2009.
(Continued)

*Primary Examiner* — Fred Casca
(74) *Attorney, Agent, or Firm* — Downey Brand LLP

(57) ABSTRACT

Apparatus and methods for provisioning wireless devices for operation in one or more networks. In one embodiment, a provisioning service may provide access client (e.g., Subscriber Identity Module) data to a secure element in the wireless user device. The device may be preloaded with a provisioning SIM profile. The device may use the provisioning profile to roam onto a carrier, and communicate with a provisioning service, which may present the user with a list of available wireless carriers, such as carriers that service the user's current geographic location. In response to a user selection, the provisioning service may load a SIM profile associated with the selected carrier onto the secure element. The loaded SIM profile can be used to obtain wireless service from the selected carrier. The user may add multiple SIM profiles, and/or may delete SIM profiles.

20 Claims, 11 Drawing Sheets

Related U.S. Application Data

(60) Provisional application No. 61/354,653, filed on Jun. 14, 2010.

(51) Int. Cl.
| | | |
|---|---|---|
| *H04W 8/18* | (2009.01) | |
| *H04L 29/08* | (2006.01) | |
| *H04W 8/08* | (2009.01) | |
| *H04W 8/26* | (2009.01) | |
| *H04W 88/06* | (2009.01) | |

(58) Field of Classification Search
CPC ..... H04W 12/00; H04W 60/00; H04W 64/00; H04M 15/715; H04M 15/80; H04M 15/00
USPC ....... 455/406, 418, 419, 411, 558, 405, 407, 455/414.1
See application file for complete search history.

(56) References Cited

U.S. PATENT DOCUMENTS

| | | | |
|---|---|---|---|
| 2004/0233893 A1 | 11/2004 | Zhou et al. | |
| 2005/0079863 A1* | 4/2005 | Macaluso | H04W 4/00 455/419 |
| 2006/0059341 A1 | 3/2006 | Dharmadhikari et al. | |
| 2007/0149170 A1 | 6/2007 | Bloebaum et al. | |
| 2007/0174618 A1 | 7/2007 | Nakano et al. | |
| 2008/0051062 A1* | 2/2008 | Lee | H04L 63/0853 455/411 |
| 2008/0242285 A1 | 10/2008 | Riffe et al. | |
| 2008/0261561 A1 | 10/2008 | Gehrmann | |
| 2008/0268813 A1 | 10/2008 | Maes | |
| 2008/0268866 A1 | 10/2008 | Sukkarie | |
| 2009/0172419 A1 | 7/2009 | Takayama | |
| 2009/0191918 A1 | 7/2009 | Mardiks | |
| 2009/0205028 A1 | 8/2009 | Smeets et al. | |
| 2009/0235351 A1 | 9/2009 | Brown et al. | |
| 2010/0311468 A1 | 12/2010 | Shi et al. | |
| 2011/0092185 A1 | 4/2011 | Garskof | |
| 2011/0093339 A1 | 4/2011 | Morton | |
| 2011/0130117 A1* | 6/2011 | Fan | H04M 15/00 455/411 |
| 2011/0151836 A1 | 6/2011 | Dadu et al. | |
| 2011/0269423 A1 | 11/2011 | Schell et al. | |
| 2012/0028604 A1 | 2/2012 | Walden et al. | |
| 2012/0047227 A1 | 2/2012 | Haggerty et al. | |
| 2012/0108204 A1 | 5/2012 | Schell et al. | |
| 2012/0108205 A1 | 5/2012 | Schell et al. | |
| 2012/0108206 A1 | 5/2012 | Haggerty | |
| 2012/0108207 A1 | 5/2012 | Schell et al. | |
| 2012/0108295 A1 | 5/2012 | Schell et al. | |
| 2012/0115441 A1 | 5/2012 | Schell | |
| 2012/0117635 A1 | 5/2012 | Schell et al. | |
| 2012/0135710 A1 | 5/2012 | Schell et al. | |

FOREIGN PATENT DOCUMENTS

| | | |
|---|---|---|
| JP | 2010532107 | 9/2010 |
| WO | WO0219664 A2 | 3/2002 |
| WO | WO03077585 A1 | 9/2003 |
| WO | WO2009082759 A1 | 7/2009 |
| WO | WO2009092115 A2 | 7/2009 |
| WO | WO2011159549 A1 | 12/2011 |

OTHER PUBLICATIONS

PCT Application No. PCT/US2011/039854—International Search Report dated Jul. 30, 2012.
PCT Application No. PCT/US2011/039854—International Preliminary Report on Patentability dated Dec. 14, 2012.
Singapore Patent Application No. 201206900-1—Written Opinion dated May 30, 2013.
Taiwan Patent Application No. 100119987—Summary of Office Action dated Sep. 10, 2013.
Australian Patent Application No. 2011267996—Patent Examination Report No. 1 dated Sep. 16, 2013.
Japanese Patent Application No. 2013-515391—Summary of First Office Action dated Dec. 20, 2013.
Korean Patent Application No. 10-2012-7034100—Summary of Office Action dated Apr. 23, 2014.
European Patent Application No. 11728116.2-1870—First Examination Report dated Aug. 31, 2015.
Korean Patent Application No. 10-2014-106320—Office Action dated Apr. 10, 2015.

* cited by examiner

APPARATUS AND METHODS FOR PROVISIONING SUBSCRIBER IDENTITY DATA IN A WIRELESS NETWORK

CROSS-REFERENCE TO RELATED APPLICATIONS

This application is a continuation of U.S. application Ser. No. 12/952,089, filed Nov. 22, 2010, entitled "APPARATUS AND METHODS FOR PROVISIONING SUBSCRIBER IDENTITY DATA IN A WIRELESS NETWORK", which claims the benefit of U.S. Provisional Application No. 61/354,653, filed Jun. 14, 2010, entitled "METHODS FOR PROVISIONING SUBSCRIBER IDENTITY DATA IN A WIRELESS NETWORK", each of the foregoing being incorporated herein by reference in its entirety. This application is also related to co-owned U.S. Pat. No. 8,666,368, filed on Nov. 22, 2010, issued on Mar. 4, 2014, and entitled "WIRELESS NETWORK AUTHENTICATION APPARATUS AND METHODS", the foregoing being incorporated herein by reference in its entirety.

FIELD

The present invention relates generally to the field of communications systems, and more particularly in one exemplary aspect, to wireless systems that allow user devices to authenticate to wireless networks (e.g., cellular networks, WLANs, WMANs, etc.) using access control clients.

BACKGROUND

Wireless systems are used to provide voice and data services to user equipment such as cellular telephones and computers.

Conventionally, user equipment is provided with a Subscriber Identity Module (SIM) card. The SIM card includes security information such as private key information that can be used in authenticating user equipment to a cellular network.

It may not always be desirable to use conventional SIM cards. For example, conventional SIM cards can make the host device (e.g., wireless telephone) bulkier and more complicated. They also necessitate management of SIM card inventories and distribution by the manufacturer or service provider.

Conventional SIM card systems may also make it difficult to purchase wireless services. For example, it may be difficult to establish relationships with wireless carriers in foreign countries when a user is travelling.

A SIM card is typically associated with one user account. User account data is preloaded into the SIM card, and is permanently stored on the SIM card. If a user wishes to change services from an existing account to a new account, the user needs to replace an existing SIM card associated with the existing account with a new SIM card associated with the new account (e.g., by physically removing the existing SIM card from the SIM card slot and inserting the new SIM card).

In an effort to reduce the inconvenience of swapping SIM cards, SIM cards that are preloaded with two accounts have been developed. The user can switch between the two accounts without physically removing the SIM card. However, if the user wants to switch to a new account that is not one of the two accounts on the SIM card, the user of this type of SIM card will need to insert a new card. User devices that include a pair of SIM card slots have also been developed. Such user devices allow users to change between multiple accounts, but can be bulky and require that the user obtain a new SIM card for each new account.

It would therefore be desirable to be able to provide improved ways in which to provide users with the ability to obtain and manage wireless services.

SUMMARY

The present invention addresses the foregoing needs by providing, inter alia, apparatus and methods for wireless network authentication.

In one aspect of the invention, a wireless electronic device capable of download of access client data from a provisioning service to receive wireless services from a desired carrier is disclosed. This data, which may in some embodiments be referred to as Subscriber Identity Module (SIM) data, virtual SIM card data, or SIM profile, may be used in obtaining wireless services from a desired wireless carrier. For example, if a user is travelling to a foreign country and wishes to create an account with a local carrier, the user can wirelessly obtain subscriber identity data for that carrier.

In a second aspect of the invention, a user device may be preloaded with a provisioning SIM profile. During a new provisioning session, the device may roam onto a local carrier. The local carrier may contact a provisioning carrier associated with the provisioning SIM profile. If the provisioning carrier recognizes the user device (e.g., if the SIM profile of the user device is registered with the provisioning carrier), the user device may be allowed to communicate with the provisioning service. A more general version of this process allows the user device to communicate with the provisioning service even if just one provisioning carder (and its associated roaming agreements) is inadequate to cover all local carriers of interest, by allowing for multiple provisioning SIM profiles and multiple provisioning carriers, with the choice of which one to use being determined from the user device's usual passive scan of available networks that precedes an attempt at roaming or network selection or network registration. Yet another generalization allows the user device to communicate with the provisioning service over Wi-Fi or via a wired connection to an Internet-capable computer or any other non-cellular communications link.

In another aspect of the invention, the provisioning service may present the user with a list of available carriers (e.g., a list of preferred non-roaming carriers, or a list of carriers with whom the user already has an account, etc.). The user may select a desired carrier (and corresponding rate plan, if the user does not already have an existing account in place with the carrier) from the list of carriers. While maintaining a data link through the provisioning carrier, SIM data for the selected carrier may be loaded onto a secure element in the device. This creates a new SIM profile associated with the selected carrier and allows the user to use the wireless services of the selected carrier. SIM data for available carriers may be maintained and distributed by a trusted service manager (TSM) that is part of the provisioning service.

Once the SIM data for a selected carrier has been downloaded onto the user's device, the user may be presented with an opportunity to activate the carrier's services on the device by creating a new account or by logging in to an existing account with the selected carrier. The user may activate the device online, using in-store equipment, by placing a telephone call to an activation service, etc. Upon activation, the device may be used to make and receive voice telephone calls, to download and upload data, or to otherwise obtain the services available from the selected carrier.

In a further aspect of the invention, multiple SIM profiles may be provisioned using the foregoing approach. For example, as a user travels to different geographic locations, a user may repeatedly browse for new carriers and wirelessly download SIM data as needed to establish new carrier relationships. Because the user can easily set up new carrier accounts, expenses such as roaming fees can be reduced.

Moreover, the user may actively manage the SIM profiles on the user's device. For example, the user may add new SIM profiles, may delete existing SIM profiles, and may switch which carrier is being used at a given time by choosing among the multiple stored SIM profiles.

In another aspect of the invention, a method of loading subscriber identity module data onto a wireless electronic device is disclosed. In one embodiment, the method includes: receiving from a provisioning service at the wireless electronic device a list of wireless carriers to present to a user; and based at least in part on a selection of one of the wireless carriers by the user at the wireless electronic device, receiving from the provisioning service at the wireless device subscriber identity module data associated with the selected one of the wireless carriers.

In one variant, receiving from the provisioning service the subscriber identity module data includes receiving from a trusted service manager at the provisioning service the subscriber identity module data, and storing the received data in a secure element in the wireless electronic device.

In another variant, the method further includes using the subscriber identity module data stored in the wireless electronic device in establishing a wireless link between the wireless electronic device and the provisioning service.

In yet another variant, the receiving the list of wireless carriers includes receiving from a provisioning carrier at the provisioning service rate plan information associated with respective wireless carriers in the list of wireless carriers to present to the user. For example, the wireless electronic device can roam onto a wireless carrier associated with the provisioning carrier.

In another aspect of the invention, a method of operating a wireless electronic device is disclosed. In one embodiment, the device is operated in a system that includes wireless carriers and a provisioning service that are interconnected by a communications network, and the method includes: using first access client data to establish a link with the communications network; and loading second access client data into the wireless electronic device over the link.

In one variant, the first access client data includes a bootstrap program having minimal functionality in comparison to the second access client data, and the using first access client data includes using the first access client data to establish a wireless link with the communications network. Loading the second access client data includes for example wirelessly loading the second access client data in the wireless electronic device over the wireless link.

In another variant, the first access client data includes access client data associated with a provisioning carrier, and wherein using the first access client data includes roaming onto a wireless cellular telephone network using the first access client data.

In a further variant, the wireless electronic device includes a secure element that includes the first access client data, and wherein wirelessly loading the second access client data includes loading the second access client data into the secure element.

In yet another variant, the provisioning service includes a trusted service manager that maintains a database of access client data for multiple carriers, and wherein wirelessly loading the second access client data includes wirelessly loading the second access client data into secure element from the trusted service manager.

In another variant, the method further includes presenting the user with an opportunity to select a desired wireless carrier from which the wireless electronic device receives wireless service, wherein the desired wireless carrier is associated with a selected one of the multiple access client data loaded into the wireless electronic device.

In still another variant, the second access client data includes subscriber identity module (SIM) data which uniquely identifies at least one subscriber account maintained with a wireless carrier.

In yet another aspect of the invention, a wireless apparatus is disclosed. In one embodiment, the apparatus includes: one or more wireless communications circuitry adapted to communicate with a communications network; a secure element configured to store one or more Subscriber Identity Module (SIM) data; a processor; and a storage device in data communication with the processor, the storage device comprising computer-executable instructions. The computer-executable instructions are configured to, when executed by the processor: verify an account with a provisioning carrier; establish a data link between the wireless apparatus and the provisioning carrier; receive the one or more SIM data; and operate the wireless apparatus using the one or more SIM data.

In one variant, the one or more wireless communications circuitry includes cellular telephone circuitry.

In another variant, the one or more wireless communications circuitry includes short-range local or personal area network wireless circuitry.

In still another variant, the wireless apparatus additionally includes a user interface, and the computer-executable instructions are further configured to: receive input from the user interface, the input related to one or more user needs; and updates the one or more SIM data based at least in part on received input.

In a further variant, the computer-executable instructions are further configured to: receive input from the user interface, the input related to one or more SIM profiles stored on the secure element; and switch to one of the one or more SIM data based at least in part received input.

In yet another variant, the computer-executable instructions are further configured to: receive input from the user interface, the input related to account information; and activate one or more SIM data based at least in part on the received input.

In another aspect of the invention, network apparatus is disclosed. In one embodiment, the apparatus includes: one or more communications circuitry adapted to communicate with a communications network; a processor; and a storage device in data communication with the processor, the storage device comprising computer-executable instructions. The computer-executable instructions are configured to, when executed by the processor: in response to a user selecting a desired carrier, allocate one or more SIM data associated with the desired carrier to a user device; establish a wireless link to the user device; load the allocated one or more SIM data to the user device; and notify the service provider of the loaded one or more selected SIM data.

In one variant, the apparatus includes a trusted service manager, and the wireless link is secure.

In another variant, the secure wireless link is based on a common secret key. The common secret key is used to encrypt and decrypt traffic between the trusted service manager and the user device.

In yet another aspect of the invention, a system for provisioning wireless user devices with access client (e.g., SIM) data is disclosed. In one embodiment, the system includes a provisioning entity and a trusted service manager in communication with one another. The user devices, when properly identified and authenticated, receive the SIM data from the system, thereby enabling their operation within a wireless network.

In yet another aspect of the invention, a computer readable apparatus is disclosed. In one embodiment, the apparatus includes a medium containing at least one computer program, the at least one program being configured to provision wireless user devices with access client (e.g., SIM) data. In another embodiment, the at least one program is configured to negotiate with a network entity, and obtain SIM data for use on a wireless device.

Further features of the present invention, its nature and various advantages will be more apparent from the accompanying drawings and the following detailed description.

BRIEF DESCRIPTION OF THE DRAWINGS

The features, objectives, and advantages of the invention will become more apparent from the detailed description set forth below when taken in conjunction with the drawings, wherein.

DETAILED DESCRIPTION

Reference is now made to the drawings wherein like numbers refer to like parts throughout.

Those of ordinary skill in the related arts will recognize that various embodiments of the present invention are useful for both prior art architectures (e.g., SIM data embodied within a physical SIM card), and new architectures (e.g., SIM data stored within a secure element). In some variants, the present invention may further enable combinations of both prior art card operation and secure element operation, enabling support for legacy SIM cards that aren't stored within the secure element.

Moreover, while the exemplary embodiments described herein are primarily discussed in the context of Subscriber Identity Modules (SIMs) of a cellular network such as a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from the use of one or more virtualized access clients.

Figure 1:
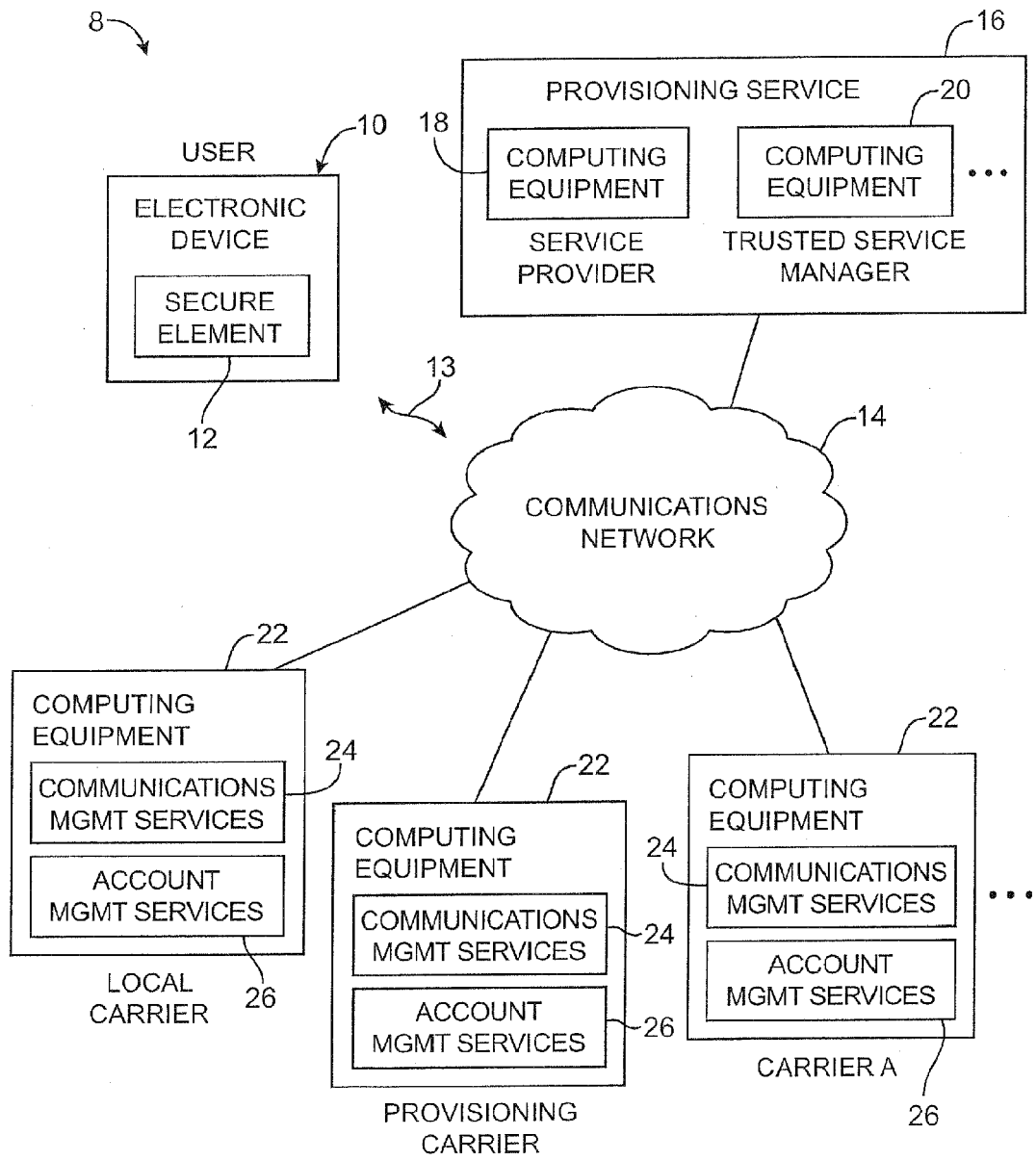
FIG. 1 is a diagram of an illustrative wireless system in accordance with an embodiment of the present invention.

Referring now to FIG. 1, an illustrative wireless system 8 in which a user of electronic equipment such as the electronic device 10 may obtain subscriber identity data from a provisioning service is shown. The electronic device 10 may be, for example, a cellular telephone, a tablet computer, a laptop computer, or other suitable computing equipment. If properly authorized, the device 10 may be provided with wireless network services from a wireless carrier (sometimes referred to as a cellular telephone company).

The user device 10 may have wireless communications circuitry. For example, the device 10 may use long-range wireless communications circuitry such as cellular telephone circuitry to communicate over a wireless link 13 using cellular telephone bands at 850 MHz, 900 MHz, 1800 MHz, and 1900 MHz (e.g., the main Global System for Mobile Communications or GSM cellular telephone bands). Long-range wireless communications circuitry in device 10 may also accommodate the 2100 MHz band or any of the other increasingly numerous bands used for cellular telephony (e.g., as outlined in the 3GPP body of standards for GSM, UMTS, and beyond). If desired, the device 10 may also use shorter-range wireless communications links to accommodate communications with nearby equipment. For example, the device 10 may communicate using the Wi-Fi® (IEEE 802.11) bands at 2.4 GHz and 5 GHz, and/or the Bluetooth® band at 2.4 GHz.

As shown in FIG. 1, the device 10 may communicate over the link 13 with a communications network 14. The link 13 may be for example a wired link, or a local or remote wireless link. In a typical wireless connection arrangement, the device 10 may communicate wirelessly with the network 14 using a long-range link (e.g., a link that may cover distances of a mile or more). Links of this type may be made, for example, with cellular telephone base stations. Communications network may include wide area networks such as the internet, telephone networks, local area networks, or any other suitable communications networks.

Using the link 13 and network 14, the device 10 may form communications links with computing equipment such as computing equipment 22, and may interact with a provisioning service such as provisioning service 16. Different sets of computing equipment 22 may be connected to the network 14. Each set of computing equipment 22 may be used to provide communications management services 24 and account management services 26 for a respective carrier.

The communications management services 24 may be responsible for managing and monitoring telephone service usage (e.g., for tracking the total number of minutes used by wireless customers during each billing cycle) and data service usage (e.g., for providing the device 10 with access to the mobile Web). The account management services 26 may be responsible for managing user account information and handling billing information associated with each registered account. Other systems (e.g., network control systems) may be used to manage the operations of each carrier, if desired.

As shown in the example of FIG. 1, a first set of computing equipment 22 may be used to provide communications management services 24 and account management services 26 for a local carrier, whereas a second set of computing equipment 22 may be used to provide the services 24, 26 for a provisioning carrier, and whereas a third set of computing equipment 22 may be used to provide the services 24, 26 for carrier A. Additional sets of computing equipment 22 may be used in the wireless system 8 to provide the services 24, 26 for additional carriers (e.g., carrier B, carrier C, etc.).

Carriers generally require that wireless users be properly authenticated before wireless services are provided. For example, carrier A may maintain subscriber identity data that is used in determining whether a given user is authorized to use the services of carrier A. The subscriber identity data may sometimes be referred to as Subscriber Identity Module (SIM) data, virtual SIM card data, SIM profile information, etc. Unauthorized users (e.g., users who do not have active accounts) will be denied service. Authorized users will be allowed to establish links such as the link 13 to make and receive voice telephone calls, to download and upload data, or to otherwise obtain the services available from carrier A.

Conventionally, SIM data is distributed to authorized users in the form of SIM cards. This approach generally requires the availability of a SIM card slot in a user device. With arrangements of the type shown in FIG. 1, it is advantageously not necessary for the device 10 to receive SIM data in the form of a removable SIM card. Rather, virtual SIM card data may be distributed using wired and/or wireless network connections (e.g., the link 13). To allow a user to download SIM card data even if the user is traveling and does not have an account with a local carrier, a user's device may be provided with a "bootstrapping" SIM profile (i.e., SIM data that is associated by a temporary carrier—sometimes referred to as a provisioning carrier), exemplary embodiments of which are described in various of the patent applications previously incorporated by reference herein.

The device 10 may include a secure element such as secure element 12 (FIG. 1). SIM data may be stored on the secure element 12 in the device 10. The provisioning service 16 may be responsible for loading the desired SIM data onto the device 10. The provisioning service 16 may rely on operations provided by a service provider and a trusted service manager (TSM) running on the computing equipment 18, 20, respectively (as an example). The service provider may be responsible for interacting with the user to determine from which the carrier device 10 receives wireless services, while the trusted service manager may be responsible for providing the corresponding SIM data associated with the selected carrier that is to be loaded onto the secure element 12 in the device 10. The TSM may be managed by a company that also distributes SIM cards. The TSM may therefore be responsible for maintaining a database of virtual SIM card data (SIM data). The TSM may maintain relationships with carriers and may maintain a database of SIM data for each carrier (i.e., SIM data for each carrier that may be supplied to a user who wishes to establish a relationship with that particular carrier). If desired, other divisions of labor may be used. For example, all of services of the trusted service manager and the service provider may be provided by a single organization. More than two entities may provide the services of the provisioning service 16, etc.

Unlike conventional SIM cards, SIM data stored on the secure element 12 may be updated according to a user's needs. Multiple SIM profiles may be stored on the secure element 12, each of which is associated with a different wireless account. The user may add a new SIM profile (e.g., by downloading additional SIM data onto the secure element 12), may delete an existing SIM profile (e.g., by erasing SIM data from the secure element 12), may switch among the multiple downloaded SIM profiles (e.g., as the user travels from country to, country or otherwise experiences a need to change carriers), etc.

For example, consider a scenario in which a user of the device 10 travels internationally and wishes to obtain wireless service without being charged international roaming rates. The device 10 may be preloaded with a provisioning SIM profile. The provisioning SIM profile establishes a relationship between the user's device and a temporary provisioning carrier. The user of the device 10 need not have an actual account with the provisioning carrier. For example, the manufacturer of the device 10 (e.g., the service provider at equipment 18) or other entity may maintain the provisioning account. Nevertheless, because the provisioning account is active on the user's device, the device 10 can detect a local carrier over the communications network 14 by roaming onto the local carrier network. The local carrier may communicate with the provisioning carrier to determine whether the device 10 is properly associated with the provisioning carrier. The provisioning carrier may be ABC Telecom, Inc. (as an example).

If the provisioning carrier recognizes the device 10 as a registered device (e.g., if the provisioning carrier recognizes the preloaded provisioning SIM profile), the local carrier will allow the device 10 to communicate over the network 14 with the provisioning service 16. The service provider at the provisioning service 16 may interact with the user to help the user select a desired carrier. The service provider may present a list of carriers to the user. The user may choose to receive services from locally available wireless carriers such as carrier A, carrier B, etc.

After viewing the list, the user may select carrier A as a desired carrier. The service provider may inform the trusted service manager of this choice. The trusted service manager of the provisioning service 16 may then establish a data link with the device 10 to load a corresponding new SIM profile (e.g., SIM data associated with carrier A) onto the secure element 12 of the device 10. The new SIM profile may overtake the provisioning SIM profile as the primary SIM profile of the device 10. Upon successful download of the new SIM profile, the user may activate service with the selected carrier (e.g., carrier A) by creating a new account with the selected carrier. Account activation operations may be performed using any of the traditional methods supported by wireless carriers (e.g., over the phone, in a store, via the web, etc.) or may be performed with the assistance of the provisioning service 16 (e.g., the service provider at the equipment 18).

The user may initiate a new provisioning session at any time to download additional SIM profiles onto the device 10 using this approach. For example, if the user travels to another new country, the user may choose to receive wireless services from carrier X and a new SIM profile associated with carrier X will be downloaded and stored in the secure element 12. When the user travels back and forth between countries in which carrier accounts have been established, the user may manually switch between the two SIM profiles or the device 10 may automatically switch to the correct SIM profile depending on its current location (e.g., using satellite positioning system data, wireless network information, or manually inputting geographic information). If desired, the user may download and manage more than two SIM profiles on the device 10. The user may also delete one or more SIM profiles from the secure element 12 of the device 10 (e.g., before selling the device 10 to a new user).

In addition to forming remote wireless links, the device 10 may form local wireless links. For example, the device 10 may have a wireless local area network adapter that allows the device to communicate wirelessly with wireless local area network equipment. The wireless local area network equipment may be, for example, a router or access point that supports IEEE 802.11 communications (sometimes referred to as Wi-Fi®). If desired, the device 10 may also or alternatively be connected to the network 14 using a cable. When a remote wireless link is available, however, the device 10 need not be connected to a wireless local area network or (via a wired link) a computer on the network 14.

The example of FIG. 1 is merely illustrative. Other wireless equipment may also be used in the network 14 and in forming the wireless communications link 13 with the network 14.

Figure 2:
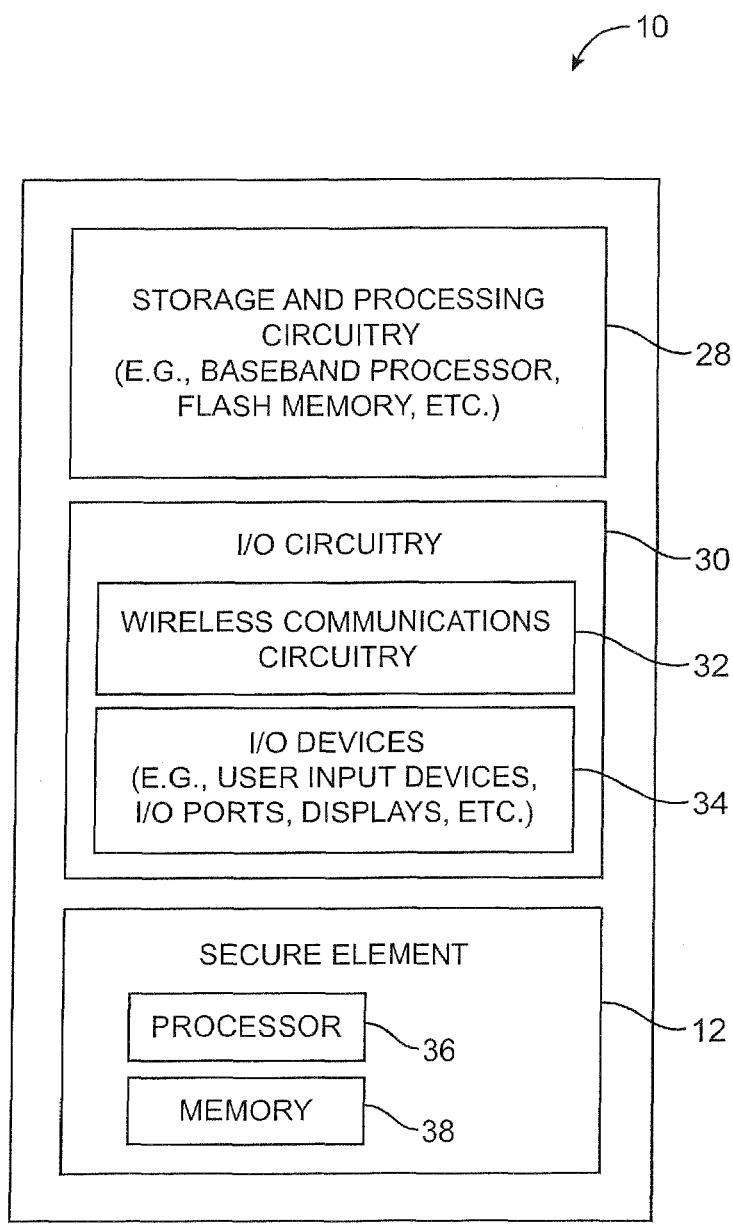
FIG. 2 is a diagram of an illustrative wireless electronic device with a secure element in accordance with an embodiment of the present invention.

FIG. 2 shows a diagram of the exemplary device 10 of FIG. 1. As shown in FIG. 2, the device 10 may include storage and processing circuitry such as storage and processing circuitry 28. The storage and processing circuitry 28 may include storage circuitry and processor circuitry. The storage circuitry may include one or more different types of storage such as hard disk drive storage, nonvolatile memory (e.g., flash memory or other electrically-programmable-read-only memory), volatile memory (e.g., static or dynamic random-access-memory), etc. The processor circuitry may be used to control the operation of the device 10 and may be based on a processor such as a microprocessor, a baseband processor, a digital signal processor, application specific integrated circuits, and other suitable circuitry. The storage and processing circuitry 28 may be used to run software on the device 10 such as media services, internet browsing applications, operating system functions, etc.

The input-output circuitry 30 may be used to allow data to be supplied to the device 10 and to allow data to be provided from the device 10 to external devices. The input-output circuitry 30 can include user input-output devices 34 such as buttons (e.g., a menu button), a display (e.g., a touch screen), click wheels, scrolling wheels, touch pads, key pads, keyboards, microphones, cameras, etc. A user can control the operation of the device 10 by supplying commands through the user input-output devices 34. There may also be components in the device 10 that contain audio interface equipment such as jacks for external headphones, sensors, input-output ports (e.g., to connect the device 10 to the network 14 through a wired connection).

The input-output circuitry 30 may also include wireless communications circuitry such as wireless communications circuitry 32. The wireless communications circuitry 32 may include circuitry such as antennas, radio-frequency (RF) transceiver circuitry, radio-frequency power amplifier circuitry, passive RF components, and other circuitry for handling RF wireless signals.

The secure element 12 of the device 10 may include a processor such as a secure element processor 36 and memory circuitry such as a memory 38, as shown in FIG. 2. The secure element processor 36 may be responsible for handling secure communication (e.g., for encoding and decoding secure content) with the provisioning service 16 during downloading of SIM data. Downloaded SIM data may be stored on the memory 38 of the secure element 12. Memory 38 may include a 200 kB electrically erasable programmable read-only memory (E2PROM) or smaller or larger blocks of non-volatile memory (as examples).

Figure 3:
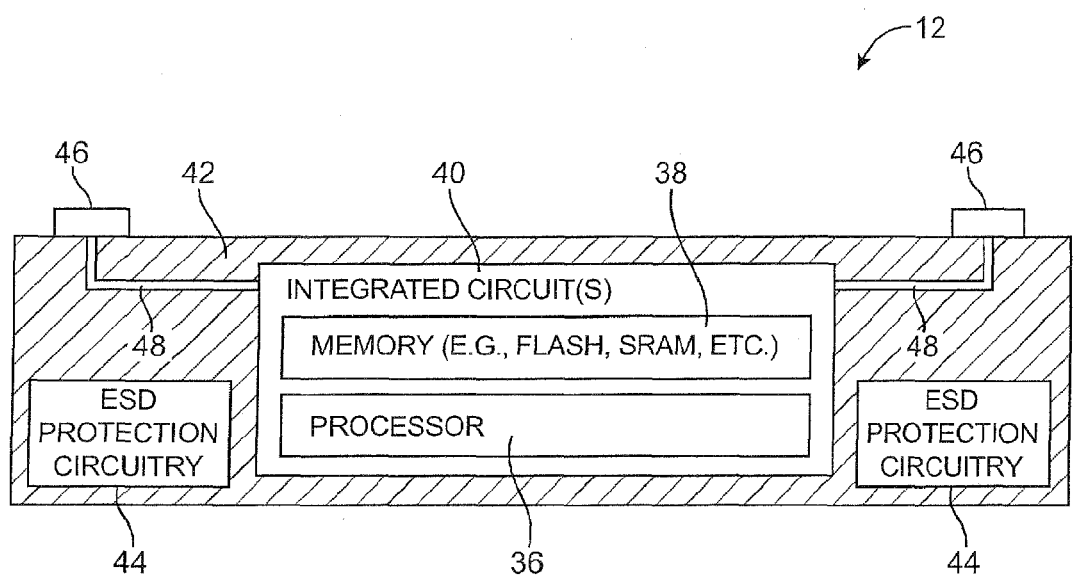
FIG. 3 is a diagram of an illustrative secure element in accordance with an embodiment of the present invention.

FIG. 3 is a diagram of an exemplary embodiment of the secure element 12. As shown in FIG. 3, the processor 36 and memory 38 of the secure element 12 may be formed in one or more integrated circuits 40. The integrated circuits 40 may be connected to package bond pads 46 through conductive lines 48. Electrostatic discharge (ESD) protection circuitry 44 (either separate devices or circuitry incorporated into the circuits 40) may be used to prevent undesired currents from damaging the circuitry of the secure element 12. The package that forms the secure element 12 may be filled with epoxy resin 42 to prevent external probing of data signals on the integrated circuit 40. Other tamper-proof structures may be included in the secure element 12 if desired (e.g., shielding layers, masking layers, etc.).

Figure 4:
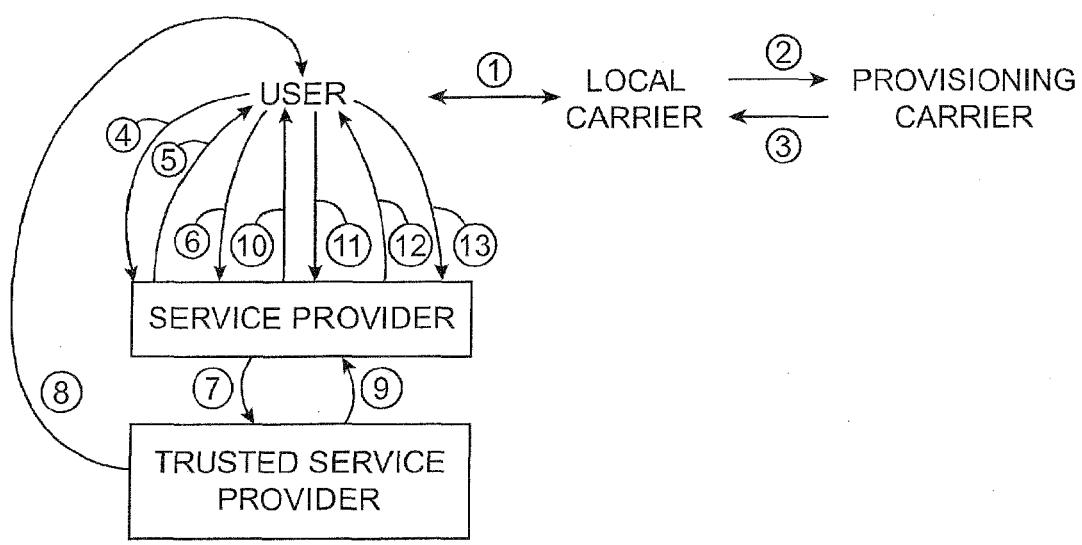
FIG. 4 is a diagram showing an illustrative sequence that may be used to exchange data among different entities in a wireless system of the type shown in FIG. 1 in accordance with an embodiment of the present invention.

FIG. 4 is a diagram that shows illustrative steps involved in provisioning SIM data on the device 10. As shown in FIG. 4, the user device 10 may first communicate with a local carrier upon startup (step 1). The device 10 may convey information to the local carrier from a provisioning SIM profile stored in the device. At step 2, the local carrier may use the provisioning SIM data to contact a corresponding provisioning carrier to check whether the provisioning SIM profile is associated with an active account (e.g., the local earlier may relay identification information to the provisioning carrier for verification). Upon verification (step 3), the local carrier will allow the device 10 to form a roaming wireless link (e.g., the link 13) with the network 14. Once the roaming link has been formed with the network 14, the device 10 may form a connection with the service provider at the service 16 (step 4).

Figure 5:
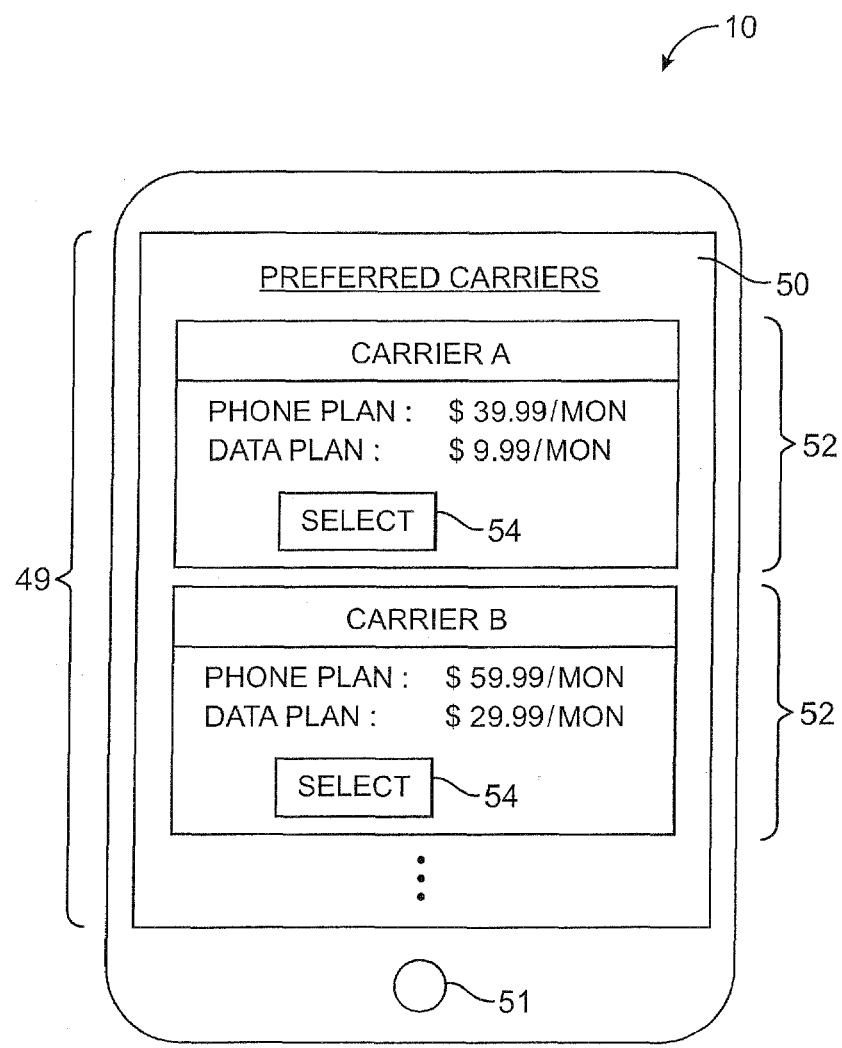
FIG. 5 is an illustrative selection screen that may be presented to provide a user with an opportunity to select a desired carrier in accordance with an embodiment of the present invention.

During step 4, the device 10 and the provisioning service 16 may initiate a new provisioning session. In the provisioning session, the service provider may direct the device 10 to display on-screen options for the user. For example, the provisioning service 16 may provide a selection screen 49 for the display 50 of the device 10, as shown in FIG. 5 (step 5). The display 50 of the device 10 may be a touch screen. The device 10 may receive user input via the touch screen and buttons, such as a menu button 51.

As shown in FIG. 5, a screen of on-screen options such as a selection screen 49 may be used to present the user with a list of available carriers (e.g., local carriers in the vicinity of the user, carriers recommended by the provisioning service 16, or other carriers). Rate plans (e.g., cellular telephone plan rates, data plan rates, blended plan rates, and other service rates) may be displayed for each carrier in regions such as the regions 52 on the screen 49. Each region 52 may include a selectable on-screen option such as a button 54 on the touch screen 50. On-screen buttons on a touch screen are sometimes referred to as virtual buttons. If desired, other systems may be used for gathering user input with the device 10 (e.g., voice recognition systems, pattern recognition using cameras, physical buttons that are adjacent to options displayed on a screen, on-screen options that are selected by a user using a mouse, trackpad, or other pointing device, or any other suitable user input interface).

As shown in the example of FIG. 5, the list of carriers that is presented to the user may include a first region 52 that displays information related to a first carrier A, a second region 52 that includes information related to a second carrier B, etc. The phone plan and data plan for carrier A may be listed respectively as $39.99 per month and $9.99 per month in the first region, whereas the phone plan and data plan for carrier B may be listed respectively as $59.99 per month and $29.99 per month in the second region (as examples). Carrier selection screens such as the carrier selection screen 49 of FIG. 5 may list more than two carriers or may only list one possible carrier. If desired, there may be multiple rate plans listed under each carrier (e.g., carrier A may have a first phone plan that costs $39.99/month and that includes 450 minutes of talking time and a second phone plan that costs $59.99/month and that includes 900 minutes of talking time). If desired, each region 52 may display additional rate plan details (e.g., the number of free night and weekend minutes included with the plan, contract length, activation fee information, etc.). The user may be provided with an opportunity to select or unselect a data plan. Drop-down menus and other user interfaces may be used to allow a user to select from various different plan components (e.g., to choose how many minutes of talk time are to be included in the plan). If desired, the carrier selection screen 49 may only be used to provide carrier choices and not particular plan details. In configurations in which the screen 49 is used only or primarily to facilitate selection of a desired carrier, the user may make plan type selections at a later time (e.g., when interacting with the provisioning service 16 or when interacting directly with a website or representative of the selected carrier). For example, a user may select a desired carrier using the screen 49 and may select a plan type during a telephone call that user makes with the selected carrier to finalize plan details and activate the selected carrier for the device 10.

At step 6 in the illustrative arrangement of FIG. 4, the user may select a desired carrier and rate plan by pressing on a corresponding virtual select button 54 or otherwise interacting with the options presented by the provisioning service 16. Once the user has selected the desired carrier and a desired type of service (i.e., a desired wireless service plan), the provisioning service 16 may download SIM data for that carrier to the user's device. The downloaded SIM data includes information of the type contained on a conventional SIM card (e.g., an identifier that is specific to the SIM "card", information identifying the selected carrier, etc.).

In systems in which the provisioning service 16 is implemented using a service provider and a trusted service manager, the service provider may be responsible for presenting the user with carrier selections options (e.g., the screen 49 of FIG. 5) and in processing user responses, whereas the trusted service provider may be responsible for handling the secure transfer of the SIM data from the trusted service provider to the device 10 (e.g., over the network 14 and link 13). In response to user selection of a desired carrier, for example, the service provider at the provisioning service 16 may direct the trusted service manager (TSM) to distribute SIM data associated with the selected carrier to the user device 10 (step 7).

At step 8, the trusted service manager may communicate with the device 10 to establish a wireless link. The link between the trusted service manager and the processor 28 of the device 10 may initially be established as an insecure link. To ensure security during the SIM data download process, the trusted service manager and the secure element 12 of the device 10 may set up a secure link before the SIM data is downloaded. If desired, the device 10 (i.e., the processor in the secure element 12) and the trusted service manager may share a common secret key that is not known to the public and this key may be used to encrypt and decrypt data traffic between the trusted service manager and the device 10. Other forms of secure communication may be used to establish a secure link between the secure element 12 and the trusted service manager if desired.

Figure 6:
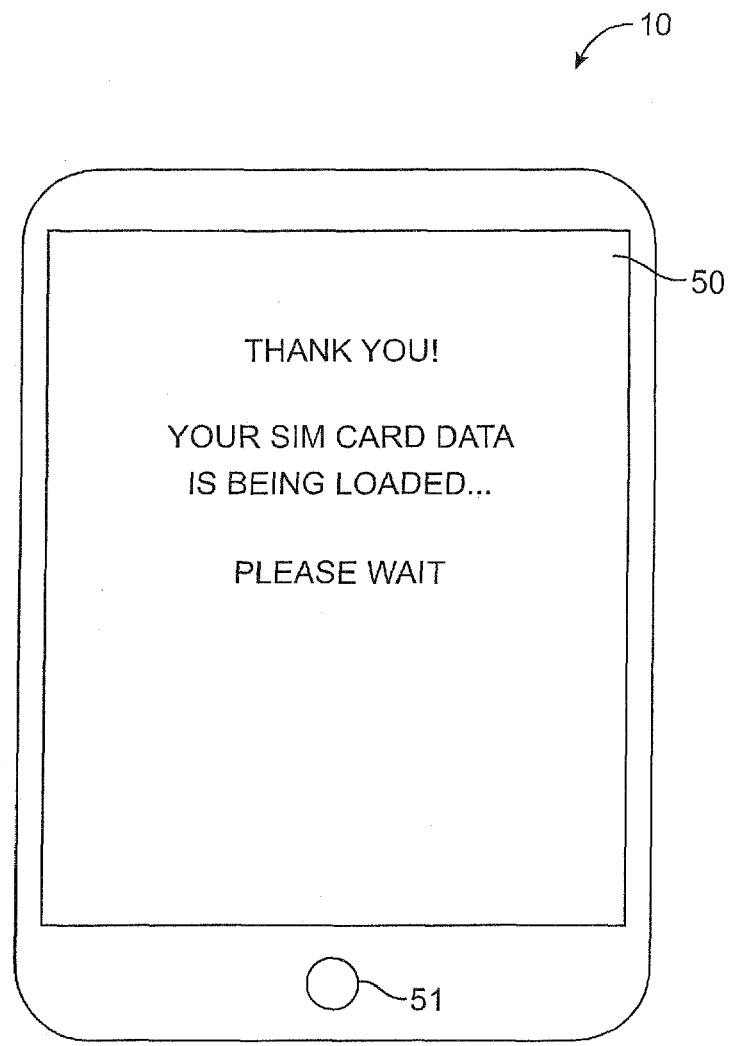
FIG. 6 is an illustrative output screen that may be displayed to a user during downloading of subscriber identity data in accordance with an embodiment of the present invention.

Due to the presence of secure communications on communications path between device 10 and the provisioning service 16 (e.g., the trusted service manager), data that is transmitted between the trusted service manager and the secure element 12 may be said to exhibit "end-to-end" security. When a successful link has been formed between the TSM and the secure element 12, the TSM may load the secure element 12 with the desired SIM data. When new SIM data is being downloaded onto the device 10, the device may be directed to display a loading message on display 50, as shown in FIG. 6. For example, the display 50 may output to the user the message, "Thank you! Your SIM card data is being loaded. Please wait" during step 8 of FIG. 4.

Figure 7:
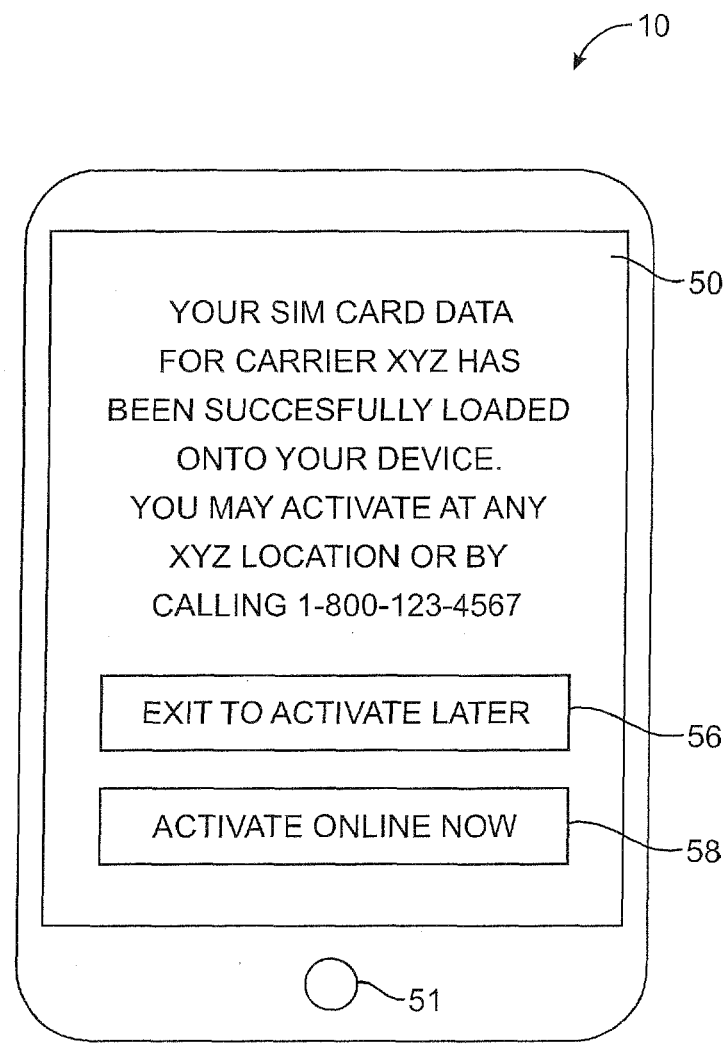
FIGS. 7 and 8 are illustrative input screens that may be presented to provide a user with an opportunity to activate a wireless account in accordance with an embodiment of the present invention.

When the desired SIM data has been loaded into the secure element 12 of the device 10, the trusted service manager may notify the service provider that loading is complete (step 9). At step 10, the service provider may direct the device 10 to display an activation instruction message on the display 50, as shown in FIG. 7. For example, the provisioning service 16 may provide a confirmation message to the device 10 so that the display 50 presents the user with a message such as "Your SIM card data for Carrier A has been successfully loaded onto your device. You may activate at any Carrier A store location or you may activate by calling 1-800-123-4567 or by visiting www.carrierawebsite.com."

The display 50 may also display on-screen options such as the virtual buttons 56, 58 (see, e.g., FIG. 7). If the user wants to activate the device 10 at a later time (e.g., if the user wants to activate the device by calling the given telephone number, by visiting one of the retail stores of the selected carrier, by activating later online, etc.), the user can select the option (button) 56. The user can select the option (button) 58 for example if the user wishes to activate the device 10 online by visiting the account activation webpage for the selected carrier.

If the user selects the option 58, the provisioning service 16 (e.g., the service provider) may redirect the user to an account management web page or other service portal that is associated with the selected carrier. Using this type of online interface with the selected carrier, the user may create a new account or may link the device 10 to an existing account.

Figure 8:
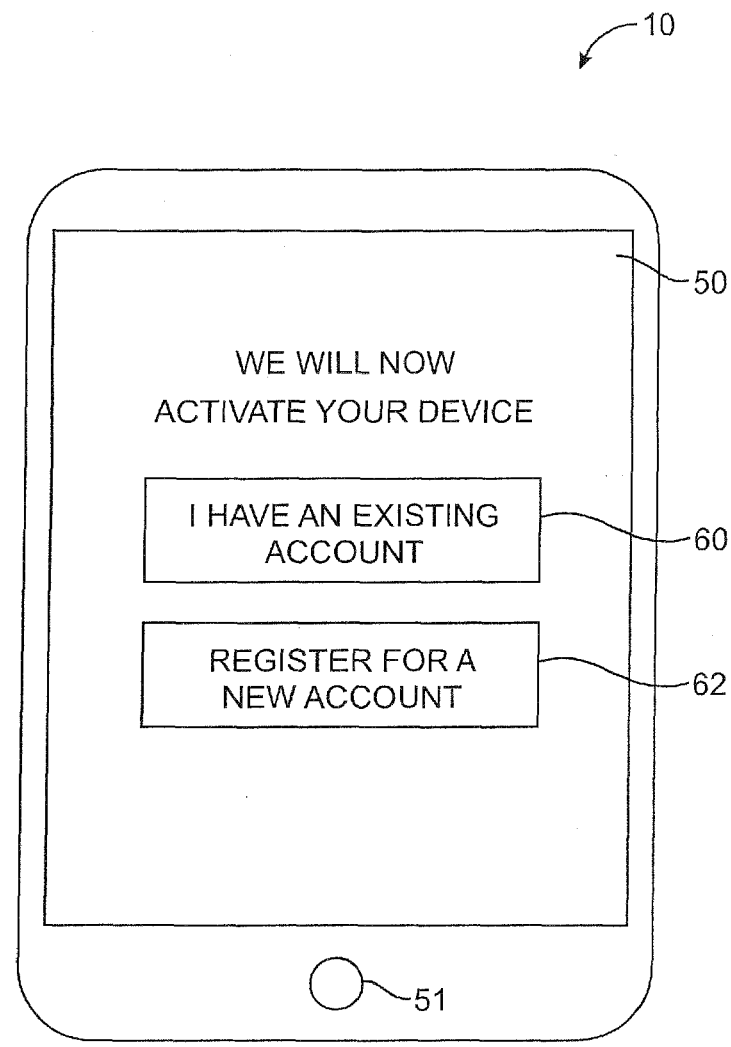

If desired, account management functions such as these may be provided by the provisioning service 16. For example, when a user selects the option 58, the provisioning service 16 (e.g., the service provider) may direct the device 10 to display an account selection screen on the display 50, as shown in FIG. 8. The service provider at the provisioning service 16 may, as an example, provide screen data to the device 10 so that the display 50 presents the user with the message, "We will now activate your device." The display 50 may also display virtual buttons 60, 62 (see, e.g., FIG. 8). If the user already has an existing account with the selected carrier, the user can select the option (button) 60. If the user does not have an existing account with the selected carrier, the user can select the option (button) 62 to sign up for a new account (step 11).

Figure 9:
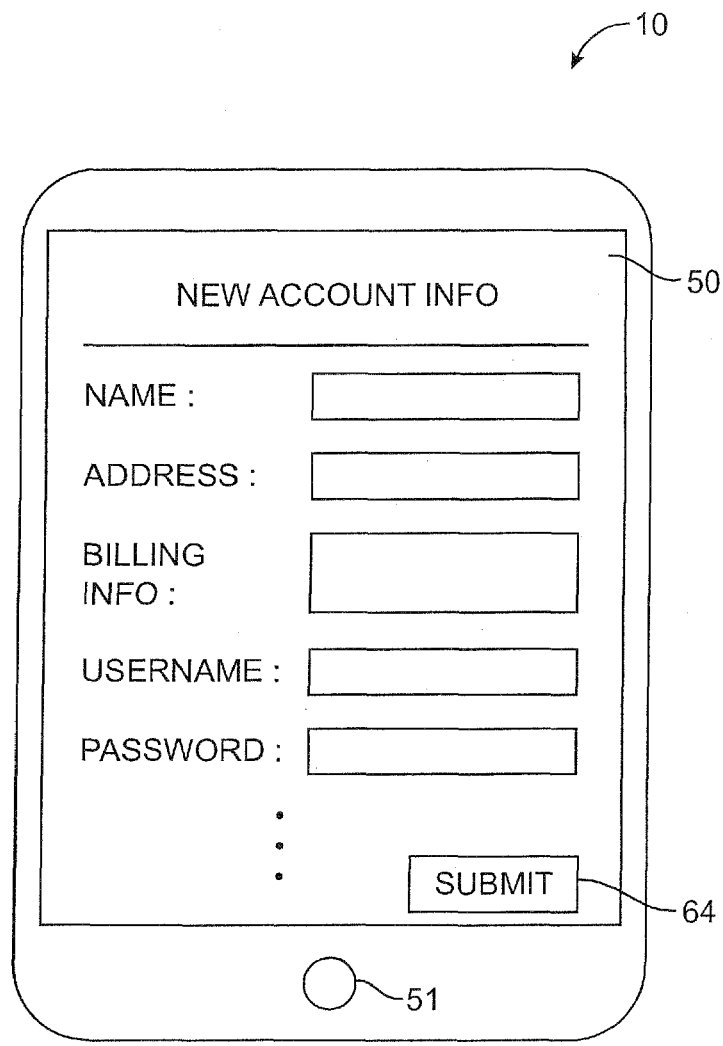
FIG. 9 is an illustrative input screen that may be presented to provide a user with an opportunity to input new account information in accordance with an embodiment of the present invention.

If the user selects the button 62, the service provider at the provisioning service 16 (or, the carrier in configurations in which the carrier handles account setup and management operations) may provide the device 10 with information that directs the device 10 to display a new account information input screen on the display 50, as shown in FIG. 9 (step 12). For example, the display 50 may display a prompt for the user that directs the user to supply new account information such as the user's name, address, billing information, username, password, and other personal information. At step 13, the user may supply the requested information into corresponding fillable text boxes (see, e.g., FIG. 9) by typing on a touch keypad that is optionally displayed on display 50 or by using alphanumeric input keys.

Figure 10:
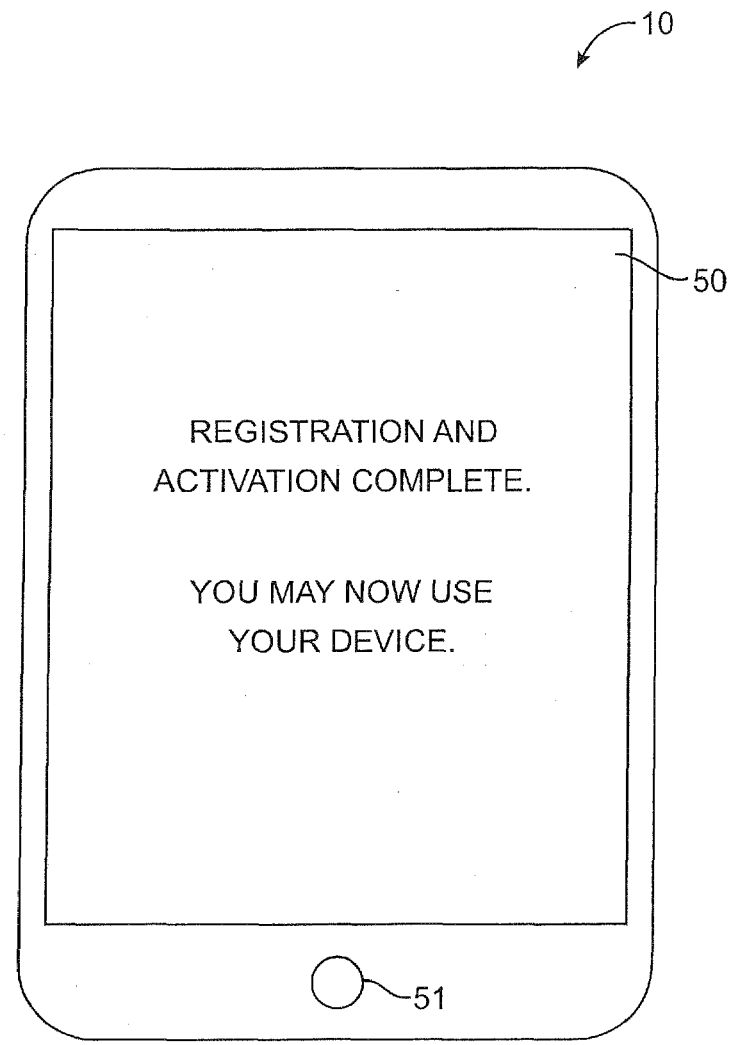
FIG. 10 is an illustrative output screen that may be displayed to a user upon activation of a wireless account in accordance with an embodiment of the present invention.

When the user has finished supplying the new account information to the provisioning service or carrier, the user may select the option 64 to submit the new account information (e.g., to the service provider at the provisioning service or directly to the services 26 at the selected carrier). If this information is submitted to the provisioning service, the provisioning service (e.g., the service provider) may relay this information to the account management services 26 of the selected carrier. The display 50 may then display an activation completion message, as shown in FIG. 10. For example, the display 50 may output to the user the message, "Registration and activation complete. You may now use your device." The device 10 may then be used to make and receive voice telephone calls, to download and upload data, or to otherwise obtain the services available from the selected carrier.

At this point, communications between the provisioning service 16 and the device 10 may be terminated (e.g., the provisioning session may be terminated). A new provisioning session may be initiated and the provisioning service 16 may be contacted by device 10 whenever the user wishes to add additional SIM profiles to the device 10 (e.g., using an approach of the type described in connection with FIG. 4).

Figure 11:
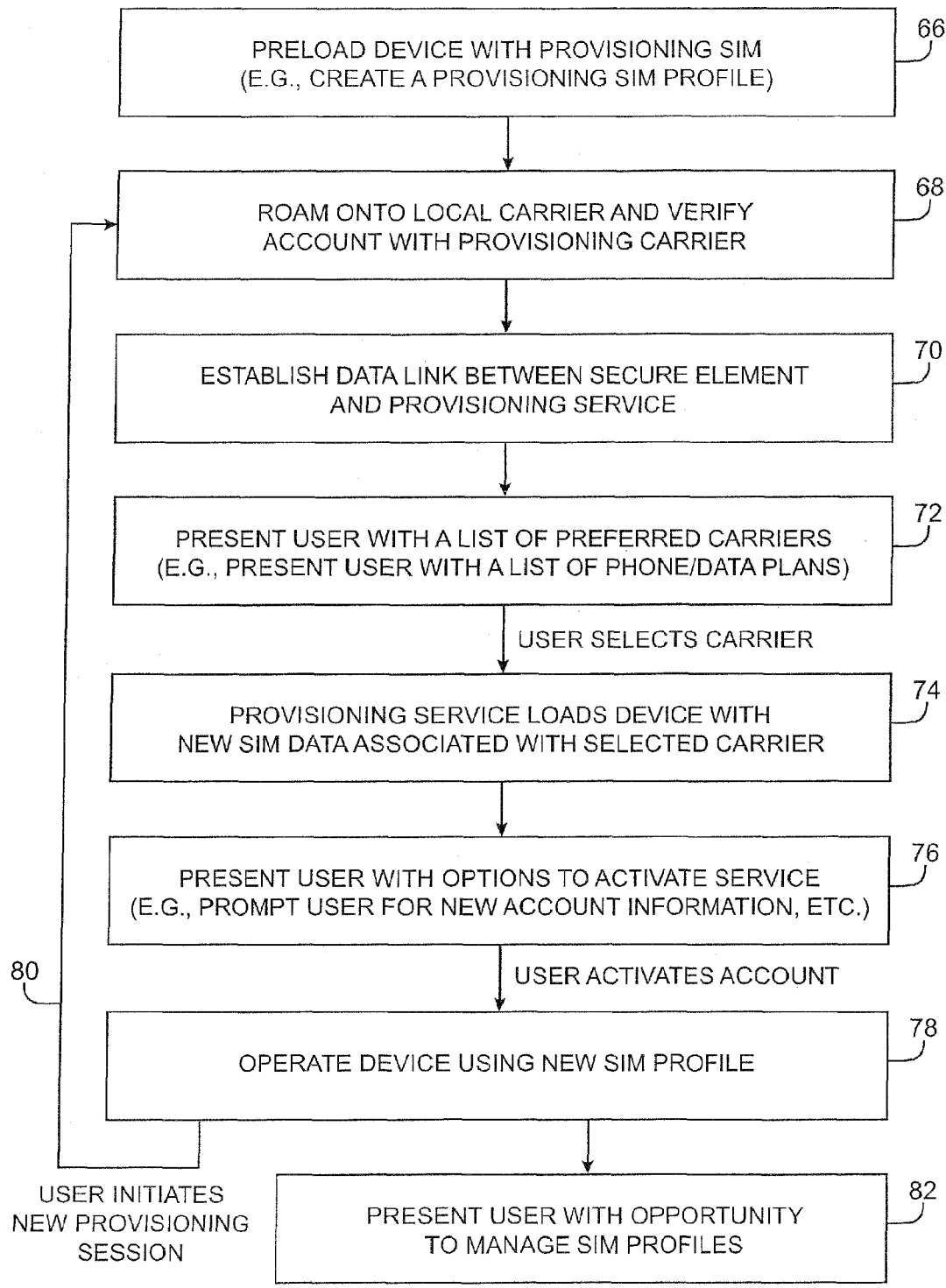
FIG. 11 is a flow chart of illustrative steps involved in wirelessly provisioning a wireless electronic device with multiple subscriber identity profiles in accordance with an embodiment of the present invention.

FIG. 11 is a flow chart of illustrative steps involved in provisioning the device 10 with new SIM data. The device 10 may be preloaded with a provisioning SIM profile at step 66. For example, SIM data associated with the provisioning carrier of FIG. 1 (sometimes referred to as provisioning SIM data) may be stored in memory in the secure element 12 (e.g., during manufacturing or during a firmware loading or update process for the device 10). A manufacturer of the device 10 (e.g., a manufacturer associated with the service provider of the provisioning service 16) or other entity may maintain an account with the provisioning carrier, so that the SIM data associated with the provisioning carrier corresponds to an active account that can be used by the user of the device 10 during provisioning operations (i.e., when communicating with the provisioning service 16 during the provisioning session and/or when performing follow-up communications with a selected carrier or the provisioning service to activate a newly established account). The provisioning carrier may be located in any desired country (i.e., a single provisioning carrier may be used globally) or there may be a separate provisioning carrier used for each country or other geographic region of interest. If desired, some geographic regions may have multiple associate provisioning carriers. The provisioning carrier or carriers for which SIM data is loaded into the device 10 preferably have roaming agreements with numerous carriers, so that the device 10 can roam onto a local carrier (for SIM provisioning) in a wide variety of service locations.

At step 68, a user who desires to establish a new carrier relationship and who desires to download SIM data to allow the device 10 to use the services of the new carrier may use the device 10 to roam onto a local carrier in the vicinity of the device (i.e., via the link 13). The local carrier can communicate with the provisioning carrier that is associated with the provisioning SIM data to verify that the device 10 is authorized to roam onto the local carrier's network. Because a provisioning carrier account is being maintained in good standing by the manufacturer of the device 10 (e.g., the service provider at provisioning service 16 or other entity), the verification process will be successful.

Upon successful verification that the device 10 is authorized to use the services of the local carrier, the local carrier will allow the device 10 to use the wireless link 13 with the network 14. The device 10 (or other equipment in the system of FIG. 1) may then initiate a provisioning session with the provisioning service 16. During this provisioning session, a data link may be established between the device 10 and the provisioning service 16 (step 70). At step 72, the provisioning service (e.g., a service provider of the provisioning service) may present the user with a list of available carriers and, if desired, corresponding rate plans. The user may select a desired carrier from the list of displayed carriers. The provisioning service (e.g., the trusted service manager) may establish a secure link with the secure element 12 in device 10 and may load the secure element 12 (i.e., the storage in element 12) with new SIM data that is associated with the selected carrier (step 74).

At step 76, the provisioning service may present the user with information on how to activate the device 10 (i.e., how to use wireless services associated with the selected carrier by activating the SIM data for the selected carrier). Activation operations may be handled by any suitable entity (e.g., the provisioning service 16, the carrier, etc.).

With one suitable arrangement, the provisioning service 16 may initially present the user with different options for activating wireless service associated with the newly selected carrier. If the user decides to activate online, the user may be asked to enter new account information by the provisioning service or the carrier, as described in connection with FIG. 9. Once the user activates either an existing account or a new account, the device 10 may receive wireless service from the selected carrier using the new SIM data that was downloaded from the provisioning service (step 78).

As indicated by path 80, the SIM profile download process of FIG. 11 may be used whenever the user wants to add an additional SIM profile (e.g., whenever the device 10 is moved to a new location such as a location that requires a new carrier relationship to obtain desired services). In such locations, the secure element 12 can be updated with one or more SIM profiles associated with available carriers.

The user may be allowed to actively manage the different SIM profiles stored on the secure element 12 of the device 10 (step 82). For example, a user may have three active SIM profiles that can be used to receive wireless services in the user's country of residence. The user may switch among the three SIM profiles as needed. If desired, the user may choose to erase some or all of the SIM profiles stored on the device 10. A user may, for example, use storage and the processing circuitry 28 and the secure element 12 to erase SIM data from the secure element 12 before selling the device 10 to a stranger (as an example).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed:

1. A method for acquiring subscriber identity module (SIM) data at a mobile device, the method comprising: by the mobile device:
   establishing a roaming connection with a roaming wireless carrier based on a SIM provisioning profile, wherein the SIM provisioning profile is preloaded on the mobile device;
   providing, to the roaming wireless carrier, identification data from the SIM provisioning profile for a provisioning carrier to use in checking whether the SIM provisioning profile is associated with an active account;
   receiving, from a provisioning service via the roaming wireless carrier, a list of wireless carriers;
   sending, to the provisioning service, an indication of a selection of a wireless carrier from the list of wireless carriers;
   receiving, from the provisioning service, SIM data associated with the selected wireless carrier; and
   storing the SIM data in a secure element included in the mobile device, wherein the SIM data is usable by the mobile device to access services provided by the selected wireless carrier.

2. The method of claim 1, wherein a trusted service manager associated with the provisioning service provides the SIM data to the mobile device.

3. The method of claim 2, further comprising: establishing, prior to receiving the SIM data, a secure link with the trusted service manager.

4. The method of claim 3, wherein the mobile device and the trusted service manager share a secret key.

5. The method of claim 1, wherein the list of wireless carriers includes rate plan information associated with wireless carriers in the list of wireless carriers.

6. The method of claim 1, further comprising:
   accessing a service provided by the selected wireless carrier, wherein the accessing is based on an authentication using the SIM data.

7. The method of claim 1, further comprising:
   sending new user account information to the provisioning service, wherein the new user account information comprises a username.

8. The method of claim 1, further comprising:
   before the sending the indication of the selected wireless carrier:
   displaying, on a display of the mobile device, rate plan information, wherein the rate plan information comprises: i) a first phone plan rate and a first data plan rate of a first wireless carrier, and ii) a second phone plan rate and a second data plan rate of a second wireless carrier.

9. The method of claim 8, further comprising:
   after receiving the SIM data:
   displaying, on the display of the mobile device, a confirmation message, wherein the confirmation message indicates a successful loading of the SIM data.

10. A mobile device configured to acquire subscriber identity module (SIM) data, the mobile device comprising:
    a processor configured to cause the mobile device to carry out steps that include:
    identifying a SIM provisioning profile that is accessible to the mobile device and usable to access a provisioning service, wherein the SIM provisioning profile is preloaded on the mobile device;
    establishing a roaming connection with a roaming wireless carrier based on the SIM provisioning profile;
    using the SIM provisioning profile, communicating, to the provisioning service, information associated with the SIM provisioning profile for a provisioning carrier to use in checking whether the SIM provisioning profile is associated with an active account;
    receiving, from the provisioning service, a list of wireless carriers;
    obtaining a selection of a wireless carrier included in the list of wireless carriers;
    sending, to the provisioning service, an indication of the selected wireless carrier;
    receiving, from the provisioning service, SIM data associated with the selected wireless carrier; and
    storing the SIM data in a secure element included in the mobile device, wherein the SIM data is usable by the mobile device to access services provided by the selected wireless carrier.

11. The mobile device of claim 10, wherein the mobile device receives the SIM data from a trusted service manager associated with the provisioning service.

12. The mobile device of claim 10, wherein the list of wireless carriers includes rate plan information associated with wireless carriers in the list of wireless carriers.

13. The mobile device of claim 10, wherein the provisioning service corresponds to a geographic region in which the mobile device is located.

14. The mobile device of claim 10, wherein the steps further comprise:
    establishing, prior to receiving the SIM data, a secure link with a trusted service manager associated with the provisioning service.

15. The mobile device of claim 14, wherein the mobile device and the trusted service manager share a secret key.

16. The mobile device of claim 15, wherein: i) the receiving SIM data comprises receiving a SIM profile from the trusted service manager over the secure link, and ii) the secure link is based on the secret key.

17. The mobile device of claim 16, wherein the steps further include:
    accessing a service provided by the selected wireless carrier, wherein the accessing is based on an authentication using the SIM data.

18. A non-transitory computer-readable storage medium configured to store instructions that, when executed by a processor included in a mobile device, cause the mobile device to carry out steps that include:

establishing a roaming connection with a roaming wireless carrier based on a subscriber identity module (SIM) provisioning profile, wherein the SIM provisioning profile is preloaded on the mobile device;

providing, to the roaming wireless carrier, identification data from the SIM provisioning profile for a provisioning carrier to use in checking whether the SIM provisioning profile is associated with an active account;

receiving, from a provisioning service via the roaming wireless carrier, a list of wireless carriers;

sending, to the provisioning service, an indication of a selection of a wireless carrier from the list of wireless carriers;

receiving, from the provisioning service, SIM data associated with the selected wireless carrier; and storing the SIM data in a secure element included in the mobile device, wherein the SIM data is usable by the mobile device to access services provided by the wireless carrier.

19. The non-transitory computer-readable storage medium of claim 18, wherein the mobile device receives the SIM data from a trusted service manager associated with the provisioning service.

20. A non-transitory computer-readable storage medium of claim 19, wherein the mobile device and the trusted service manager share a secret key.

* * * * *